United States Patent
Grinshpun et al.

(10) Patent No.: US 11,483,739 B2
(45) Date of Patent: Oct. 25, 2022

(54) METHOD AND SYSTEM FOR AUTOMATED DYNAMIC NETWORK SLICE DEPLOYMENT USING ARTIFICIAL INTELLIGENCE

(71) Applicant: Nokia Solutions and Networks Oy, Espoo (FI)

(72) Inventors: Edward Grinshpun, Freehold, NJ (US); Cinzia Sartori, Pullach (DE); Sameerkumar Sharma, Holmdel, NJ (US)

(73) Assignee: Nokia Solutions and Networks OY, Espoo (FI)

( * ) Notice: Subject to any disclaimer, the term of this patent is extended or adjusted under 35 U.S.C. 154(b) by 184 days.

(21) Appl. No.: 16/970,565

(22) PCT Filed: Feb. 25, 2018

(86) PCT No.: PCT/US2018/019611
§ 371 (c)(1),
(2) Date: Aug. 17, 2020

(87) PCT Pub. No.: WO2019/164518
PCT Pub. Date: Aug. 29, 2019

(65) Prior Publication Data
US 2020/0396645 A1    Dec. 17, 2020

(51) Int. Cl.
*H04W 28/16*    (2009.01)
*G06F 16/783*    (2019.01)
(Continued)

(52) U.S. Cl.
CPC .......... *H04W 28/16* (2013.01); *G06F 16/783* (2019.01); *G06N 5/04* (2013.01); *G06V 20/40* (2022.01);
(Continued)

(58) Field of Classification Search
CPC ..... H04W 28/16; H04W 36/04; H04W 36/32; G06F 16/783; G06N 5/04; G06V 20/40;
(Continued)

(56) References Cited

U.S. PATENT DOCUMENTS 9,780,997 B2    10/2017    Grinshpun et al.
2011/0102546 A1    5/2011    Dhuse et al.
(Continued)

FOREIGN PATENT DOCUMENTS

CN    107071503 A    8/2017
WO    WO-2017/011827 A1    1/2017

OTHER PUBLICATIONS

"Dynamic end-to-end network slicing for 5G—addressing 5G requirements for diverse services, use cases, and business models," Nokia White Paper, published Dec. 2016.
(Continued)

*Primary Examiner* — Fred A Casca
(74) *Attorney, Agent, or Firm* — Harness, Dickey & Pierce, P.L.C.

(57) ABSTRACT

The method includes receiving first video data and network performance information from at least one first agent node associated with at least one first camera, determining event detection information based on the first video data and the network performance information, determining a slice configuration for at least one network slice based upon the first video data, network performance information and the event detection information, and controlling an operation of the communication network by instantiating the at least one network slice based on the slice configuration information.

19 Claims, 3 Drawing Sheets

(51) Int. Cl.
*G06N 5/04* (2006.01)
*H04N 7/18* (2006.01)
*H04N 21/44* (2011.01)
*H04W 36/04* (2009.01)
*H04W 36/32* (2009.01)
*G06V 20/40* (2022.01)

(52) U.S. Cl.
CPC ....... *H04N 7/181* (2013.01); *H04N 21/44008* (2013.01); *H04W 36/04* (2013.01); *H04W 36/32* (2013.01)

(58) Field of Classification Search
CPC .................. H04N 7/181; H04N 21/44008; A63F 13/352; A63F 13/65
See application file for complete search history.

(56) References Cited

U.S. PATENT DOCUMENTS

| | | |
|---|---|---|
| 2015/0261609 A1 | 9/2015 | Resch et al. |
| 2017/0331762 A1 | 11/2017 | Miyazawa et al. |
| 2017/0367036 A1 | 12/2017 | Chen et al. |
| 2019/0349838 A1* | 11/2019 | Futaki .................. H04W 36/08 |

OTHER PUBLICATIONS

Extended European Search Report dated Sep. 23, 2021, issued in corresponding European Patent Application No. 18906841.4.
International Search Report PCT/ISA/210 for International Application No. PCT/US2018/019611 dated May 2, 2018.
Written Opinion of the International Searching Authority PCT/ISA/237 for International Application No. PCT/US2018/019611 dated May 2, 2018.

\* cited by examiner

METHOD AND SYSTEM FOR AUTOMATED DYNAMIC NETWORK SLICE DEPLOYMENT USING ARTIFICIAL INTELLIGENCE

CROSS-REFERENCE TO RELATED APPLICATIONS

This application is a national phase under 35 U.S.C. § 371 of PCT International Application No. PCT/US2018/019611 which has an International filing date of Feb. 25, 2018, the entire contents of each of which are hereby incorporated by reference.

BACKGROUND

Field

Example embodiments relate generally to a method and a system for an automated dynamic network slice deployment using artificial intelligence in a communication network, where the network may be a packet-switched or circuit-switched network, including a $5^{th}$ generation wireless communication network (5G network).

Related Art

Currently, physical and virtual network instantiation and deployment is a manual process heavily involving human operators. The process is static, not associated with any live event, and usually involves network deployment for a very long term service use (with service lifespan of weeks and months rather than tens of minutes or hours). The resource configuration selection for the network deployment is not in real-time, but instead usually involves hours or days of off-line planning. Due to the long lead-time in configuring and providing services, there is no resource dimensioning for real-time network needs. Instead, static "one shoe fits all" resource allocation is performed, that is engineered for network traffic peaks and valleys.

SUMMARY

At least one example embodiment is directed toward a method of automated dynamic network slice deployment using artificial intelligence in a communication network.

In one embodiment, the method includes receiving, by at least one first processor of a central node, first video data and network performance information from at least one first agent node associated with at least one first camera; determining, by the at least one first processor, event detection information based on the first video data and the network performance information; determining, by the at least one first processor, a slice configuration for at least one network slice based upon the first video data, network performance information and the event detection information; and controlling, by the at least one first processor, an operation of the communication network by instantiating the at least one network slice based on the slice configuration information.

In one embodiment, the determining of the event detection information includes, determining video anomaly information by performing video anomaly detection on the first video data, and determining network anomaly information by performing network anomaly detection on the network performance information, and the determining of the event detection information further being based on the video anomaly information and the network anomaly information.

In one embodiment, the method further includes determining event dimension information based on the event detection information, the event dimension information indicating a scope of an event anomaly associated with the event detection information, the determining of the slice configuration further being based on the event dimension information.

In one embodiment, the method further includes accessing a database that includes metadata information for the at least one first camera, the determining of the slice configuration further being based on the metadata information.

In one embodiment, the metadata information includes, a geographic location of the at least one first camera, an angle of view of the at least one first camera, and environmental information related to objects in a field of view of the at least one first camera.

In one embodiment, the instantiating of the at least one network slice includes instantiating public service emergency slices.

In one embodiment, the determining of the network anomaly information further includes, performing based on at least one of unusual mobility patterns caused by a number and a direction of handovers of user equipments between serving cells in one or more geographic areas.

In one embodiment, the determining of the network anomaly information further includes at least one of, performing analysis based on at least one unusual pattern including number of voice calls and mobility of user equipment performing voice calls in one or more geographic areas, and performing analysis based on at least one unusual pattern in application behavior including a number of video uploads and posts to social networks using the user equipments in one or more geographic areas.

In one embodiment, the method is performed automatically in real-time without the use of human intervention.

At least another example embodiment is directed toward a method of automated dynamic network slice deployment using artificial intelligence.

In one embodiment, the method includes obtaining, by at least one first processor of a network node, first video data and network performance information from at least one first agent node associated with at least one first camera; determining, by the at least one first processor, event detection information based on the first video data and the network performance information; determining, by the at least one first processor, a slice configuration for at least one network slice based upon the first video data, network performance information and the event detection information; and controlling, by the at least one first processor, an operation of the communication network by instantiating the at least one network slice based on the slice configuration information.

In one embodiment, the determining of the event detection information includes, determining video anomaly information by performing video anomaly detection on the first video data, and determining network anomaly information by performing network anomaly detection on the network performance information, and the determining of the event detection information further being based on the video anomaly information and the network anomaly information.

In one embodiment, the method further includes determining event dimension information based on the event detection information, the event dimension information indicating a scope of an event anomaly associated with the event detection information, the determining of the slice configuration further being based on the event dimension information.

In one embodiment, the method further includes accessing a database that includes metadata information for the at least one first camera, the determining of the slice configuration further being based on the metadata information.

In one embodiment, the metadata information includes, a geographic location of the at least one first camera, an angle of view of the at least one first camera, and environmental information related to objects in a field of view of the at least one first camera.

In one embodiment, the instantiating of the at least one network slice includes instantiating public service emergency slices.

In one embodiment, the determining of the network anomaly information further includes, performing based on at least one of unusual mobility patterns caused by a number and a direction of handovers of user equipments between serving cells in one or more geographic areas.

In one embodiment, the determining of the network anomaly information further includes at least one of, performing analysis based on at least one unusual pattern including number of voice calls and mobility of user equipment performing voice calls in one or more geographic areas, and performing analysis based on at least one unusual pattern in application behavior including a number of video uploads and posts to social networks using the user equipments in one or more geographic areas.

In one embodiment, the method is performed automatically in real-time without the use of human intervention.

At least another example embodiment is directed toward a network node.

In one embodiment, the network node includes a memory storing computer-readable instructions; and at least one first processor configured to execute the computer-readable instructions such that the at least one first processor is configured to, receive first video data and network performance information from at least one first agent node associated with at least one first camera, determine event detection information based on the first video data and the network performance information, determine a slice configuration for at least one network slice based upon the first video data, network performance information and the event detection information, and control an operation of the communication network by instantiating the at least one network slice based on the slice configuration information.

DETAILED DESCRIPTION

Figure 1:
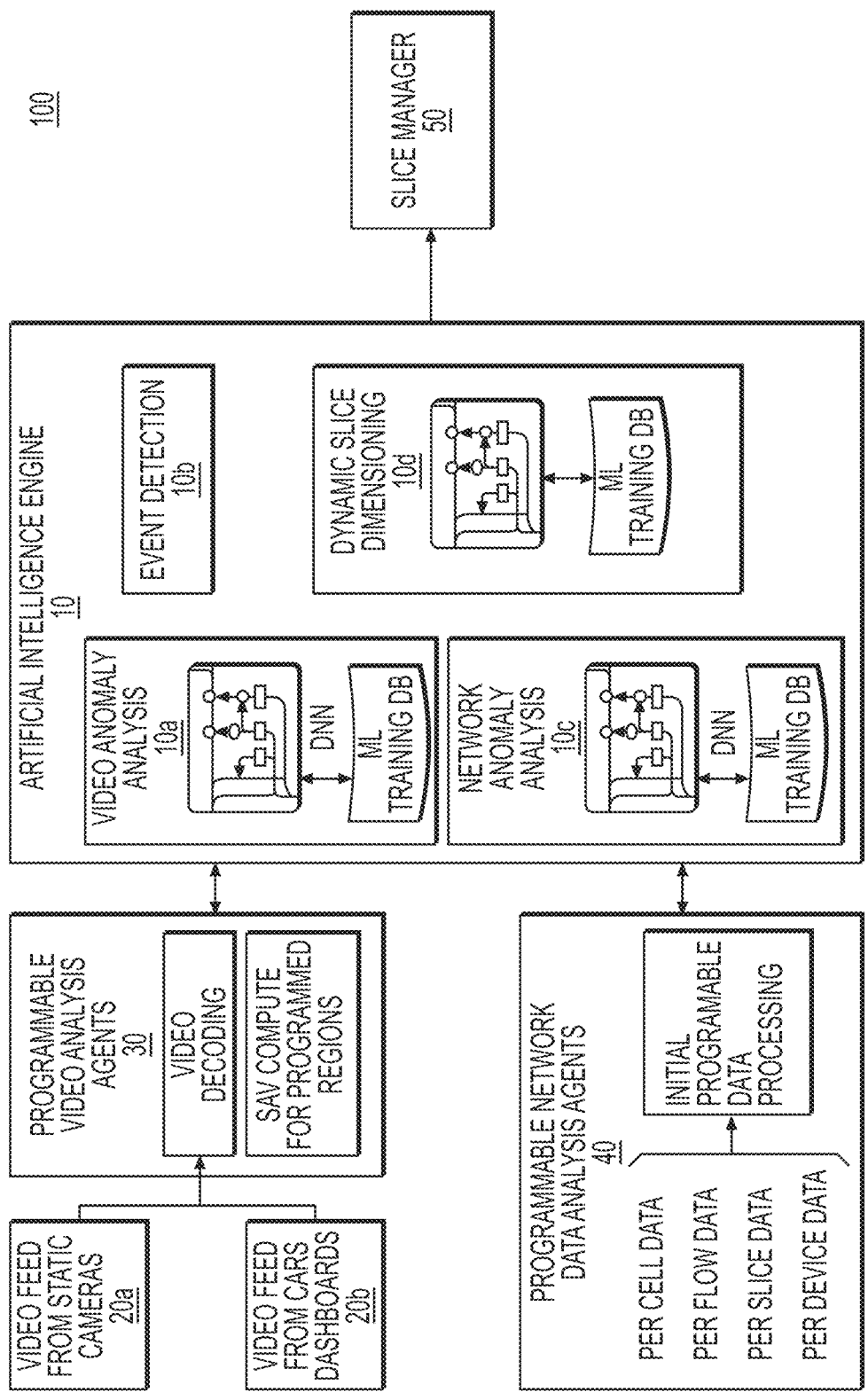
FIG. 1 illustrates a system for an automated dynamic network slice deployment using artificial intelligence, in accordance with an example embodiment.

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium, such as a non-transitory storage medium. A processor(s) may perform the necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic, optical, or flash memory, etc. Similarly, the transmission medium may be twisted wire pairs, coaxial cable, optical fiber, or some other suitable transmission medium known to the art. The example embodiments not limited by these aspects of any given implementation.

Dynamic Slices/Dynamic Network Services:

The example embodiments are directed toward an area of automated networking and service management within communications networks, where the communication network may be a $5^{th}$ generation (5G) mobile network. It is expected that services within vertical markets, such as healthcare, manufacturing, automotive industries, machine-to-machine communications, gaming, entertainment, etc., shall be enabled by dedicated, secure, customized end-to-end network slices.

A network slice is a complete end-to-end virtual network with associated service level guarantees such as session reliability, available network throughput, end-to-end latency, simultaneous number of sessions, etc. Large numbers of network slices are also expected within individual vertical markets, providing traffic separation and service level guarantees for individual tenants. For example, major automakers are expected to have one or more slices dedicated to their individual service needs within automotive vertical market. A comprehensive definition of a 'network slice' is included in "Dynamic end-to-end network slicing for 5G—addressing 5G requirements for diverse services, use cases, and business models," Nokia White Paper, published December 2016, which is incorporated herein by reference in its entirety.

Dynamic slices with heavy resource utilization can present significant challenge in terms of configuration and deployment.

One example of a "dynamic slice" is associated with public Safety Emergency service where dynamic Radio Access Network resources need to be allocated to aid recovery procedures following unexpected public safety events. The associated service may require significant bandwidth to provide high resolution uplink video from drones, stationary surveillance cameras and cameras mounted on vehicles, bi-directional video, audio and messaging between first responders, emergency vehicles, and command and control centers.

Another example where dynamic network services would be useful involves any of a variety of sporting, social and entertainment events where large number of people may gather in a relatively small areas (parks, stadiums, concert halls). Managing and orchestrating dynamic network slices requires solving real-time optimization problems to satisfy several requirements. Due to limited amounts of shared wireless spectrum, deployment of such resources consume network slices which will have a negative impact on other services, and therefore cannot be permanent. Rather, deployed/activated resources should be dynamic, and on-demand, where the resources can then be un-deployed/de-activated once the resource is no longer needed. In addition, the dynamic network service should use correctly dimensioned amounts of allocated wireless resources (cells participating in the slice, amount of resources in each cell, use of dynamic antenna arrays with MIMO, etc.). Too many resources allocated to such a dynamic slice may lead to unnecessary degradation of other network services in the area, while too few resources may jeopardize network service for emergency responders, as an example. Finally, deployment of dynamic slices for Public Safety emergency services has to be fast (within tens of seconds to a couple of minutes). As a result, manual (such as by a human operator) activation/deployment of "dynamic network slices" is impractical, and likely impossible.

General Methodology:

The proposed system and method allow for the following:

I. Fully automatic and autonomous network slice deployment without human intervention when event requiring extra network resources occurs (as opposed to current network activation that involves heavily human operations)

II. Fast (tens of seconds to minutes) deployment of dynamic network slice (as opposed to current deployments involving hours of planning, configuration, and sequential activation of network elements).

III. Exact dimensioning of network resources needed to handle the event resources, so that sufficient network resources are allocated for the event, and unnecessary resources are not used, so that disruption to other services in the area is minimal (as opposed to a conventional 'one shoe fits all' allocation of network resources leading to waste of resources when network is idle and significant service degradation during network congestion periods).

Specific Example Embodiments

FIG. 1 illustrates a system 100 for an automated dynamic network slice deployment using artificial intelligence, in accordance with an example embodiment. The system 100 dynamically instantiates/deploys network slice resources based upon an Artificial Intelligence (AI) Engine, or central node, without any human involvement. The system provides the following.

1. Automatic network slice deployment without human intervention when event requiring extra network resources occurs.

2. Fast (tens of seconds to minutes) deployment of dynamic network slice.

3. Exact dimensioning of network resources needed to handle the event needs, so that sufficient network resources are allocated for the event, and unnecessary resources are not used therefore disruption to other services in the area is minimal.

As an example, the example embodiments can be used for automatic public safety emergency network slice deployment in an area affected by a public safety event. This would allow priority network resources to quickly be given to first responders in the area. Exact dimensioning of radio access network resources involved in the slice (e.g., which cells/sectors, how many per cell resources, antenna arrays dedicated, network cloud resources) will be performed. For example, a simple two-car accident would require far less network resources allocated for emergency than large fire involving an apartment building or city block.

Autonomic and automatic AI engine functions consist of:

I. Dynamically in real time detecting public event that requires deployment of a new dynamic slice, using a combination of video anomaly analysis (live video streams from static video surveillance cameras as well as optional dashboard cameras of the vehicles) and Network anomaly analysis (using cell, flow, slice, and device data exposed for analysis by analytics agents).

II. Dimensioning the scope of the event using Video Anomaly and Network Anomaly Analysis.

III. Identifying network resources needed for the new slice, based upon the identified in (a) type of the event and identified in (b) scope of the event.

IV. Sending to a slice manager a trigger to create a new slice together with the identified RAN and Core resources to be utilized.

The brief list of functions is described below in more detail.

I. Dynamically in Real Time Detecting Public Event:

The event detection consists of a combination of Video Anomaly detection (e.g. from static video cameras 20a/20b covering the area) and Network Anomaly detection (cell data for each cell in the area, per flow data, per existing slice data. Video anomaly detection in individual camera 20a/20b feeds may be based upon Deep Neural Network analysis of video feeds from individual cameras. Input data may be in the form of Scene Activity Vectors (Dwell, Density, Direction, Velocity) computed for individual pixels and averaged over one or more selected cropped areas of the video frame. Network Anomaly detection may be based upon Deep Neural Network analysis identifying unusual mobility patterns in the area (identified for example via handovers between serving cells), number of voice calls in the area, and application patters (e.g. number of video uploads and posts to social networks originating in the area).

II. Dimensioning the Scope of the Event Using Video Anomaly and Network Anomaly Analysis:

Combining views from multiple cameras 20a/20b, a knowledge of exact camera locations and time-of-day, metadata regarding the streets/buildings in the camera view, with the data from multiple network cells in the area—allows to pinpoint the event location geographically, as well as to dimension the scope of the event. Such dimensioning for a public safety event, for example, involves determining whether the event is a small two-car accident, or a fire in a large apartment building, or an event involving a city block, etc.

III. Identifying Network Resources Needed for the New Slice, Based Upon the Identified in (a) Type of the Event and Identified in (b) Scope of the Event:

Based upon the event location and scope, AI engine 10 performs assessment of exact network resources in the area that would be needed to handle the event. This assessment may include: which 4G LTE or 5G cells/sectors and which wifi access points would be included in the new dynamic slice (determined based upon capacity, geographic locations of the respective cells, known coverage maps of the area), specific amount of cell resources (spectrum) to be allocated for the slice, core network cloud resources to support the slice, etc.

IV. Sending to Slice Manager 50 the Trigger to Create a New Slice Together with the Identified RAN and Core Resources to be Utilized:

AI 10 then sends to Slice Manager 50 Proposed Slice Template with the resources computed in (III) to trigger slice creation.

Figure 2:
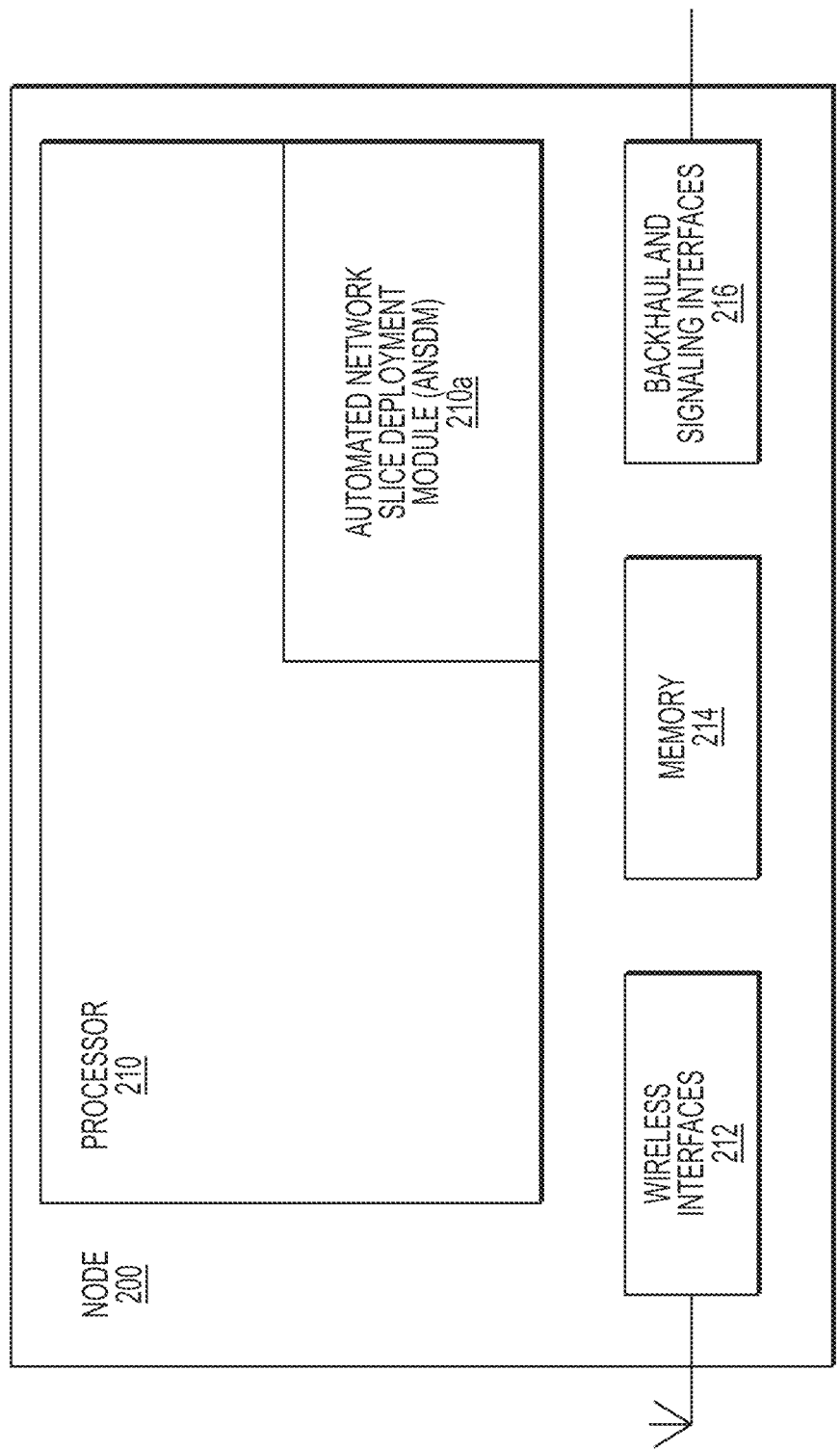
FIG. 2 illustrates a node for the system, in accordance with an example embodiment.

FIG. 2 illustrates a node 200 for the system, in accordance with an example embodiment. The node 200 may be the artificial intelligence (AI) engine 10 of the system 100 of FIG. 1. In an alternative embodiment, the node 200 may be the AI engine 10 and network data analysis agents 40 of FIG. 1. In another alternative embodiment, the node 200 may be the A engine 10, the network data analysis agents and the video analysis agents 40 of FIG. 1. The node 200 may or may not also include the slice manager 50. Furthermore, the system of FIG. 1 may include separate nodes for each of the AI engine 10, the video analysis agents 30, the network data analysis agents 40 and the slice manager 50, where each of these nodes has a same structure as node 200 of FIG. 2.

The node 200 includes network interfaces 212 (that may be wireless, or alternatively wireline) to communicate with other nodes of the system 100, signaling interfaces 216 (that may be considered a "backhaul") and a memory storage 214. The node 210 also includes a processor 210 that may control the operations of the node 200. Some of these operations of the node 200 include: saving and retrieving information/data to and from the memory 214, transmitting signaling and information to other nodes in the system 100 using the interfaces 212/216, and performing processing based at least in part on computer-readable instructions that are saved in the automated network slice deployment module (ANSDM) 210a within the processor 210. The computer-readable instructions in the ANSDM 210a may provide instructions that cause the processor 210 to perform method steps for node 200 that are commensurate with the steps that are described by the method of the example embodiments in this document. It should be understood that the processor 210 also may include a physical (PHY) layer (with different configuration modes), a media access control (MAC) layer (with different configuration modes), a packet data convergence protocol (PDCP) layer (with different configuration modes), a user plane layer (with different configuration modes), a schedule and a radio link control (RLC) buffer, where these elements of the processor 300 are not shown in the drawings. Furthermore, it should be understood that the processor 210 can be more than one processor (many processor cores).

The ANSDM 210*a* may include specialized instructions and/or databases for sub-functions of the example embodiments, where these specialized instructions and/or databases may include, for instance, a video anomaly analysis unit 10*a*, an event detection unit 10*b*, a network anomaly analysis unit 10*c* and a dynamic dimensioning unit 10*d* (as shown in the AI engine 10 of FIG. 1).

Figure 3:
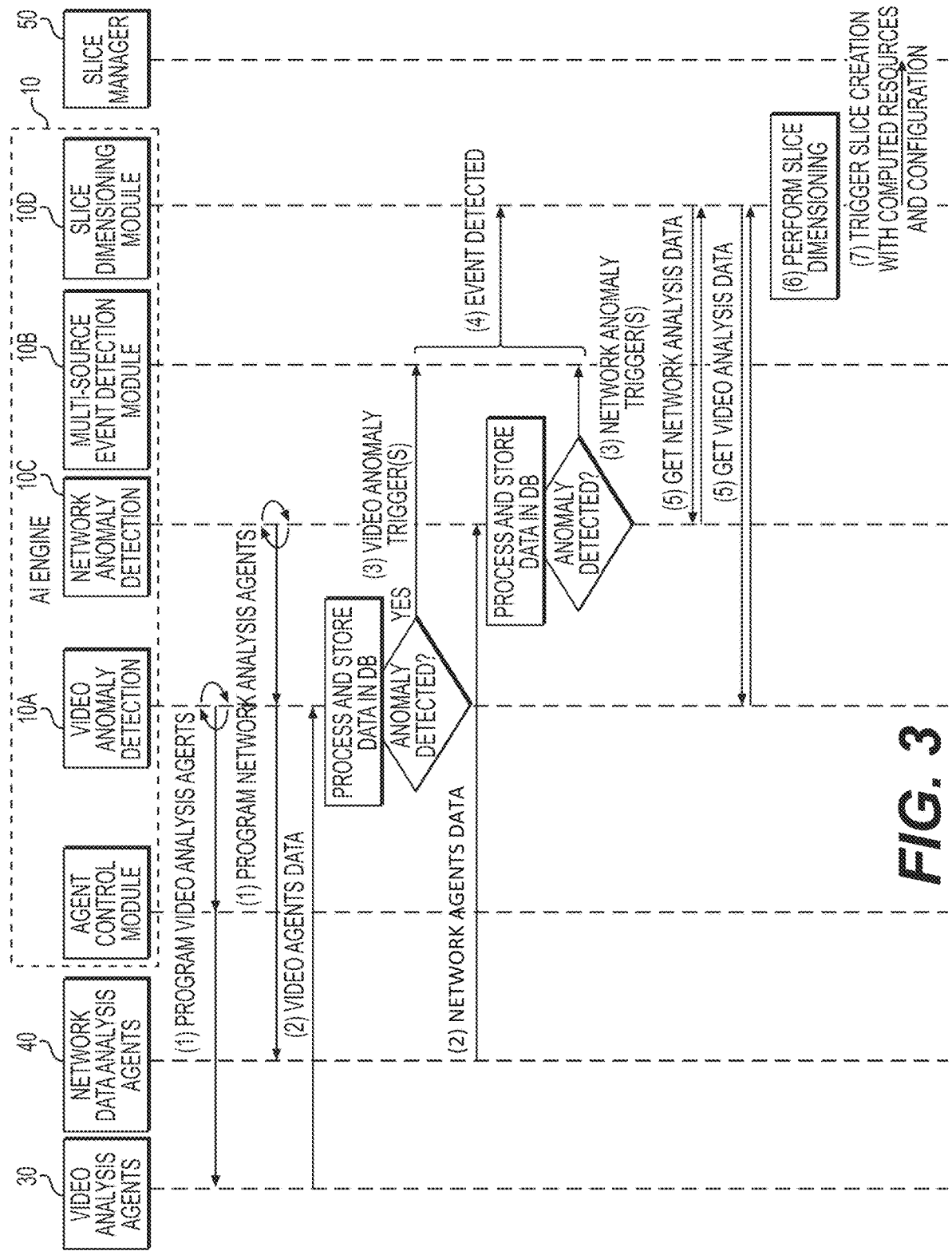
FIG. 3 illustrates a method for the automated dynamic network slice deployment, in accordance with an example embodiment.

FIG. 3 illustrates a method for the automated dynamic network slice deployment using the system 100 of FIG. 1, in accordance with an example embodiment. While this description is premised on node 200 being the AI engine 10, and the video analysis agents 30, the network data analysis agents 40 and the slice manager 50 are separate standalone nodes with a same structure as node 200, it should be understood that this same description applies equally to a system 100 hierarchy where all of the system nodes 10, 30, 40 and 50 may be the node 200, or a system 100 hierarchy where some of the nodes 30, 40 and 50 are combined along with the AI engine 10 in order to collectively comprise the node 200.

In step (1), the processor 210 of node (AI engine) 200 receives data from the processors of two types of analytics agents: Video analysis agents 30 and Network Data analysis agents 40.

The processor of the Video Analysis (VA) agents 30 receive and preprocess data from cameras 20*a*/20*b* (see FIG. 1), where the cameras 20*a*/20*b* may include a street video surveillance camera, a mobile camera mounted on car dashboard, a mobile camera mounted on drone, a body camera of law enforcement officers, etc., and send the preprocessed data to the processor 210 to be processed using instructions in the AI Video Anomaly Detection module 10*a* within ANSDM 210*a*. VA agents 30 may be located in the communication network that includes node 200, or the VA agents 30 may be collocated with the respective cameras 20*a*/20*b*. Each VA agent 30 receives raw video data from the camera, decodes it and computes Scene Activity Vectors (Dwell, Density, Direction, Velocity) for individual pixels and averaged over one or more cropped areas of the video frame. In Step (1) periodically (as a result of ongoing learning process), the processor 210 may send instructions to the agents 30 by configuring the crop areas of the video frames and optionally controlling zoom and angle of view of the cameras. In step (2) the processor of the VA agents 30 periodically (e.g. every 1 second) send the respective computed data to the processor 210 of node 200 together with an agent identifier. The processor 210 may save this information to a database in the video anomaly detection module 10*a*. The processor 210 may therefore compile an agent ID in the database mapping to the camera metadata, including geographic location of the camera, angle of view, metadata information about the objects that camera is facing (e.g. apartment building vs shopping mall vs road intersection, etc.), number of people within the building as a discrete function of time, etc.).

Network Data Analysis (NDA) agents 40 are coupled with the Radio Access and Core network functions. NDA agents 40 extract the Key Performance Indicator data on a:

per cell basis e.g. cell id coupled with geographic location, overall cell traffic volume, overall number of active sessions, cell congestion level number of handovers to/from the cell/sector coupled with the respective flow ids, per flow, e.g. flow ids together with wireless flow characteristics, application type and behavioral characteristics that can be derived from such flow characteristics (e.g. see U.S. Pat. No. 9,780,997 by one of the authors), traffic volume per slice data for the existing slices, including respective flows of the slice, per mobile device data (e.g. mobility information and running application data) the processor of the NDA agents 40 process this data by applying programmed filters and send (Step 2) the processed data digests together with the respective NDA agent ID to the processor 210 to be saved in the Network Anomaly Detection Module 10*c*. Periodically (as a result of ongoing learning process) the instructions of the Network Anomaly Detection Module may cause the processor 210 to program NDA agent filters (step 1).

Upon receiving digests from the agents 30, the instructions of the Video Anomaly Detection module 10*a* may cause the processor 210 to process the received data, and store it the learning database of the module 10*a*. The processor 210 applies pattern recognition and clustering technique to the received averaged Scene Activity Vector values to detect video anomaly in each VA agent 30 report. The processor 210 then combines processed data from multiple VA agents 30 to determine if Video Anomaly is detected. Upon video anomaly detection the processor 210 sends video anomaly trigger (step 3) to the Event Detection Module 10*b* within the ANSDM 210*a*.

Upon receiving digests from the NDA agents 40, the processor 210 processes the data using instructions from the Network Anomaly Detection module 10*c* of ANSDM 210*a* and stores it in the ML database. The processor 210 also performs network anomaly detection, based upon unusual patterns in traffic volume, mobility (e.g. may be large number of people running away from the burning stadium instead of moving towards it), high number of voice calls, unusual number of video uploads and social network chatting. Upon network anomaly detection the processor 210 sends network anomaly trigger (step 3) to the Event Detection Module 10*b* of ANSDM 210*a*.

The processor 210 reacts to the triggers for both Video and Network Anomaly in the same geographic area unit. A granularity of a geographic area of a detected event is determined by the processor 210 using instructions in the dynamic slice dimensioning unit 10*d*, where the processor 210 determines granularity of slice resource allocation and is programmable based upon the operator policy. The granularity of the event depends upon a size of a cell coverage area and a number of video cameras, as an example. Triggers for both Video and Network Anomaly allows to significantly reduce a number of False Positive events. When the event requiring dynamic Network Slice instantiation is detected by the processor 210 using instructions from the Event Detection Module 10*b*, the processor 210 sends a trigger with an area unit identifier and event type identifier to the Slice Dimensioning Module 10d of ANSDM 210a.

Upon a determination of the trigger (step 4), the processor 210 requests data about an affected and surrounding area based on instructions from the Slice Dimensioning Module 10d, and the processor 210 requests (accesses) the data from the Network Anomaly Detection 10c and Video Anomaly Detection modules 10a (in step 5). Using this data the processor of the Slice Dimensioning Module (6), the processor determines the scope of the Public Safety Event (e.g. small (car accident) vs medium (building fire), vs bigger event (affecting multiple streets or city block) vs even bigger (affecting multiple city blocks). The processor then utilizes the information about affected geographic area units and the scope of the event to determine the network resources to be allocated for the Public Safety Emergency slice needed for recovery operations, including affected Radio Access Network cells involved, amount of RAN resources to be allocated in each cell, Quality of service requirements for each cell involved, amount of Core cloud network resources. The processor uses instructions from the Slice Dimensioning Module 50 then creates a slice template with the computed resources and sends this template to Slice Manager (step 7) to trigger instantiation/activation of the Public Safety Emergency slice.

It should be understood that the nodes of the example embodiments described herein can be routers, switches, 4G wireless eNodeBs, SGW, PGW, MME, 5G wireless nodes (gNodeB, UPF), gateways, or other structural elements that are capable of fulfilling the functions and method steps outline in this document.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively connected to any suitable arrangement of devices; storing information in any suitable combination of memory(s), storage(s) or internal or external database(s); or using any suitable number of accessible external memories, storages or databases. As such, the term data storage referred to herein is meant to encompass all suitable combinations of memory(s), storage(s), and database(s).

The description and drawings merely illustrate the principles of the example embodiments. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the example embodiments, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included.

Example embodiments may be utilized in conjunction with various telecommunication networks and systems, such as the following (where this is only an example list): Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); Ultra Mobile Broadband (UMB); $3^{rd}$ Generation Partnership Project LTE (3GPP LTE); and 5G networks.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of automated dynamic network slice deployment using artificial intelligence in a communication network, comprising:
   receiving, by at least one first processor of a central node, first video data and network performance information from at least one first agent node associated with at least one first camera;
   determining, by the at least one first processor, event detection information based on the first video data and the network performance information;
   determining, by the at least one first processor, a slice configuration for at least one network slice based upon the first video data, network performance information and the event detection information; and
   controlling, by the at least one first processor, an operation of the communication network by instantiating the at least one network slice based on the slice configuration information.

2. The method of claim 1, wherein the determining of the event detection information includes,
   determining video anomaly information by performing video anomaly detection on the first video data, and
   determining network anomaly information by performing network anomaly detection on the network performance information, and
   the determining of the event detection information further being based on the video anomaly information and the network anomaly information.

3. The method of claim 2, further comprising:
   determining event dimension information based on the event detection information, the event dimension information indicating a scope of an event anomaly associated with the event detection information, the determining of the slice configuration further being based on the event dimension information.

4. The method of claim 3, further comprising:
accessing a database that includes metadata information for the at least one first camera,
the determining of the slice configuration further being based on the metadata information.

5. The method of claim 4, wherein the metadata information includes,
a geographic location of the at least one first camera,
an angle of view of the at least one first camera, and
environmental information related to objects in a field of view of the at least one first camera.

6. The method of claim 3, wherein the instantiating of the at least one network slice includes instantiating public service emergency slices.

7. The method of claim 2, wherein the determining of the network anomaly information further includes,
performing based on at least one of unusual mobility patterns caused by a number and a direction of handovers of user equipments between serving cells in one or more geographic areas.

8. The method of claim 2, wherein the determining of the network anomaly information further includes at least one of,
performing analysis based on at least one unusual pattern including number of voice calls and mobility of user equipment performing voice calls in one or more geographic areas, and
performing analysis based on at least one unusual pattern in application behavior including a number of video uploads and posts to social networks using the user equipments in one or more geographic areas.

9. The method of claim 2, wherein the method is performed automatically in real-time without the use of human intervention.

10. A method of automated dynamic network slice deployment using artificial intelligence, comprising:
obtaining, by at least one first processor of a network node, first video data and network performance information from at least one first agent node associated with at least one first camera;
determining, by the at least one first processor, event detection information based on the first video data and the network performance information;
determining, by the at least one first processor, a slice configuration for at least one network slice based upon the first video data, network performance information and the event detection information; and
controlling, by the at least one first processor, an operation of the communication network by instantiating the at least one network slice based on the slice configuration information.

11. The method of claim 10, wherein the determining of the event detection information includes,
determining video anomaly information by performing video anomaly detection on the first video data, and
determining network anomaly information by performing network anomaly detection on the network performance information, and
the determining of the event detection information further being based on the video anomaly information and the network anomaly information.

12. The method of claim 11, further comprising:
determining event dimension information based on the event detection information, the event dimension information indicating a scope of an event anomaly associated with the event detection information,
the determining of the slice configuration further being based on the event dimension information.

13. The method of claim 12, further comprising:
accessing a database that includes metadata information for the at least one first camera,
the determining of the slice configuration further being based on the metadata information.

14. The method of claim 13, wherein the metadata information includes,
a geographic location of the at least one first camera,
an angle of view of the at least one first camera, and
environmental information related to objects in a field of view of the at least one first camera.

15. The method of claim 12, wherein the instantiating of the at least one network slice includes instantiating public service emergency slices.

16. The method of claim 11, wherein the determining of the network anomaly information further includes,
performing based on at least one of unusual mobility patterns caused by a number and a direction of handovers of user equipments between serving cells in one or more geographic areas.

17. The method of claim 11, wherein the determining of the network anomaly information further includes at least one of,
performing analysis based on at least one unusual pattern including number of voice calls and mobility of user equipment performing voice calls in one or more geographic areas, and
performing analysis based on at least one unusual pattern in application behavior including a number of video uploads and posts to social networks using the user equipments in one or more geographic areas.

18. The method of claim 11, wherein the method is performed automatically in real-time without the use of human intervention.

19. A network node, comprising:
a memory storing computer-readable instructions; and
at least one first processor configured to execute the computer-readable instructions such that the at least one first processor is configured to,
receive first video data and network performance information from at least one first agent node associated with at least one first camera,
determine event detection information based on the first video data and the network performance information,
determine a slice configuration for at least one network slice based upon the first video data, network performance information and the event detection information, and
control an operation of the communication network by instantiating the at least one network slice based on the slice configuration information.

* * * * *